(12) United States Patent
Lee et al.

(10) Patent No.: US 9,495,924 B2
(45) Date of Patent: Nov. 15, 2016

(54) THREE DIMENSIONAL IMAGE DISPLAY AND LIQUID CRYSTAL LENS THEREOF

(71) Applicant: SAMSUNG DISPLAY CO., LTD., Yongin, Gyeonggi-Do (KR)

(72) Inventors: Sung Woo Lee, Gyeonggi-do (KR); Kang-Min Kim, Gyeonggi-do (KR); Jeong Min Sung, Gyeonggi-do (KR); Hyung Woo Yim, Gyeonggi-do (KR); Hyeon Yong Jang, Gyeonggi-do (KR); Jin Hwan Kim, Gyeonggi-do (KR); Seung Jun Jeong, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/525,409

(22) Filed: Oct. 28, 2014

(65) Prior Publication Data

US 2015/0116304 A1   Apr. 30, 2015

(30) Foreign Application Priority Data

Oct. 30, 2013   (KR) ........................ 10-2013-0130535

(51) Int. Cl.
*G06F 3/038*   (2013.01)
*G09G 5/00*   (2006.01)
*G09G 3/36*   (2006.01)
*G02B 27/22*   (2006.01)
(Continued)

(52) U.S. Cl.
CPC ............. *G09G 3/3611* (2013.01); *G02B 27/22* (2013.01); *G09G 3/003* (2013.01); *H04N 13/0404* (2013.01); *H04N 13/0454* (2013.01); *G09G 2310/06* (2013.01); *G09G 2320/0252* (2013.01); *G09G 2340/16* (2013.01)

(58) Field of Classification Search
CPC ...................... G09G 2330/021; G09G 3/3233
USPC ........... 345/211–213, 87–89; 349/5, 15, 190, 349/200
See application file for complete search history.

(56) References Cited

U.S. PATENT DOCUMENTS

| 8,279,362 B2 | 10/2012 | Yun et al. | |
| 2007/0257874 A1* | 11/2007 | Kim | G09G 3/3648 345/89 |
| 2008/0094334 A1* | 4/2008 | Baek | G09G 3/3677 345/89 |

(Continued)

FOREIGN PATENT DOCUMENTS

| KR | 1020110104701 | 9/2011 |
| KR | 1020120017308 | 2/2012 |

(Continued)

*Primary Examiner* — Kimnhung Nguyen
(74) *Attorney, Agent, or Firm* — F. Chau & Associates, LLC (57) ABSTRACT

A three dimensional image display includes a display panel and a liquid crystal lens positioned on the top of the display panel. The liquid crystal lens comprises a lower substrate, an upper substrate, a lens, and an electrode voltage applying IC. The lower substrate includes a first electrode. The upper substrate includes a second electrode. The upper substrate faces the lower substrate. The lens liquid crystal layer is positioned between the lower substrate and the upper substrate. The electrode voltage applying IC is configured to form a plurality of zones on the first electrode of the lower substrate by sequentially applying first voltage and second voltage to the first electrode. The first voltage includes an overshoot voltage level. The second voltage has an inverted polarity of the first voltage.

19 Claims, 10 Drawing Sheets

(51) Int. Cl.
*H04N 13/04* (2006.01)
*G09G 3/00* (2006.01)

(56) References Cited

U.S. PATENT DOCUMENTS

| | | | |
|---|---|---|---|
| 2011/0102689 A1* | 5/2011 | Chiu | G02B 27/2214 349/15 |
| 2011/0157498 A1 | 6/2011 | Kim et al. | |
| 2011/0211142 A1 | 9/2011 | Kashiwagi et al. | |
| 2012/0075434 A1 | 3/2012 | Kim et al. | |
| 2012/0162550 A1 | 6/2012 | Jeong et al. | |
| 2012/0249506 A1 | 10/2012 | Jeong et al. | |
| 2012/0293503 A1 | 11/2012 | Miyazawa et al. | |
| 2012/0300042 A1* | 11/2012 | Yun | H04N 13/0404 348/51 |
| 2013/0002970 A1 | 1/2013 | Baek et al. | |
| 2013/0100366 A1 | 4/2013 | Yun et al. | |
| 2013/0107174 A1 | 5/2013 | Yun et al. | |
| 2014/0118644 A1* | 5/2014 | Liu | G02B 27/2214 349/15 |
| 2014/0160415 A1* | 6/2014 | Peng | G02F 1/133753 349/139 |

FOREIGN PATENT DOCUMENTS

| | | |
|---|---|---|
| KR | 1020120103101 | 9/2012 |
| KR | 1020130011148 | 1/2013 |
| KR | 1020130027344 | 3/2013 |
| KR | 1020130060637 | 6/2013 |

* cited by examiner

THREE DIMENSIONAL IMAGE DISPLAY AND LIQUID CRYSTAL LENS THEREOF

CROSS-REFERENCE TO RELATED APPLICATION

This application claims priority under 35 U.S.C. §119 to Korean Patent Application No. 10-2013-0130535, filed on Oct. 30, 2013 in the Korean Intellectual Property Office, the disclosure of which is incorporated by reference herein in its entirety.

TECHNICAL FIELD

The present invention relates to a three dimensional image display and a liquid crystal lens therefor.

DESCRIPTION OF RELATED ART

Stereoscopic images may be displayed using binocular disparity. Such binocular disparity can be made using refractive anisotropy of liquid crystal layers. When stereoscopic images are displayed using liquid crystal layers, the display quality of the stereoscopic images depend on response speeds of the liquid crystal layer.

SUMMARY

According to an exemplary embodiment of the present invention, a three dimensional image display includes a display panel and a liquid crystal lens positioned on the top of the display panel. The liquid crystal lens comprises a lower substrate, an upper substrate, a lens, and an electrode voltage applying IC. The lower substrate includes a first electrode. The upper substrate includes a second electrode. The upper substrate faces the lower substrate. The lens liquid crystal layer is positioned between the lower substrate and the upper substrate. The electrode voltage applying IC is configured to form a plurality of zones on the first electrode of the lower substrate by sequentially applying first voltage and second voltage to the first electrode. The first voltage includes an overshoot voltage level. The second voltage has an inverted polarity of the first voltage.

BRIEF DESCRIPTION OF THE DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity, it will also be understood that when an element is referred to as being on another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Hereinafter, a three dimensional image display according to an exemplary embodiment of the present invention will be described in detail with reference to FIG. 1.

Figure 1:
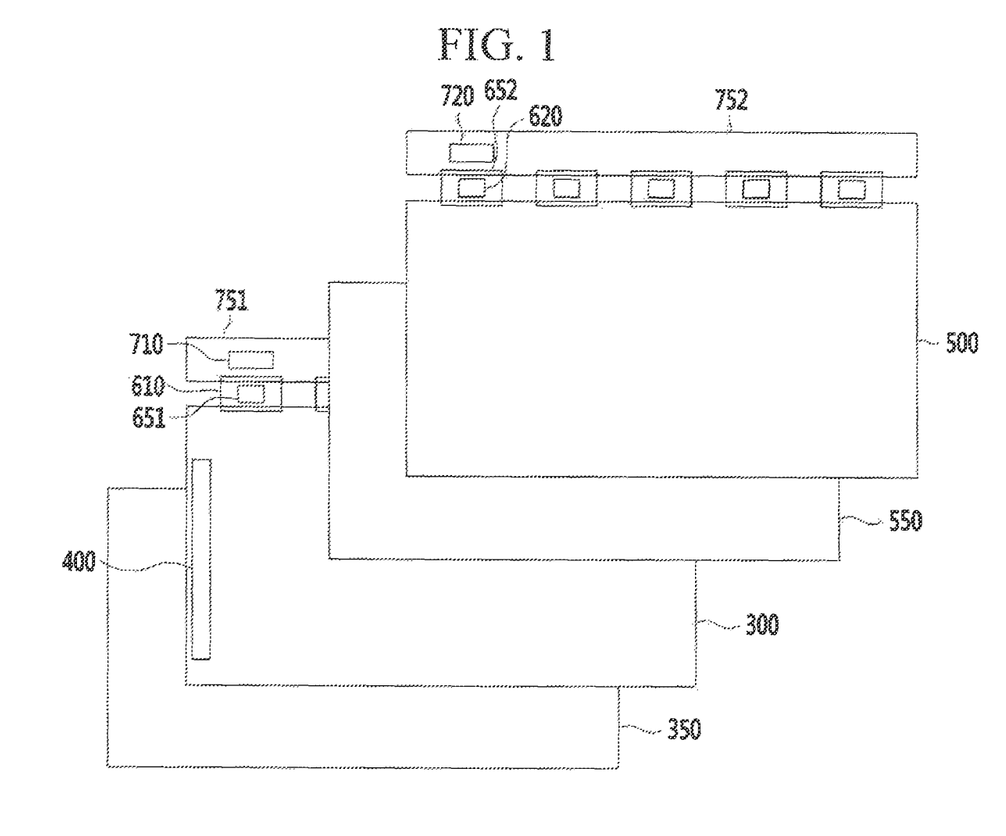
FIG. 1 is a layered view of a three dimensional image display according to an exemplary embodiment of the present invention.

FIG. 1 is a layered view of a three dimensional image display according to an exemplary embodiment of the present invention.

The three dimensional image display includes a liquid crystal panel 300, a backlight unit 350, a gap glass 550, and a liquid crystal lens 500.

First, the liquid crystal panel 300 displaying a two dimensional (2D) image and the backlight unit 350 will be described. The liquid crystal panel 300 and the backlight unit 350 are also collectively called a 2D image display device.

First, the liquid crystal panel 300 includes a lower panel (also referred to as a thin film transistor panel), a liquid crystal layer, and an upper panel.

The lower panel with a thin film transistor includes a gate line transferring a gate signal, a data line transferring data voltage, a thin film transistor (alternatively, a switching element) connected to the gate line and the data line, and a pixel electrode connected to an output terminal of the thin film transistor, which are formed on an insulating substrate, and a lower polarizer is attached to a back surface of the insulating substrate.

The upper panel may include a black matrix formed on the insulating substrate in a lattice structure, openings defined by the black matrix, color filters placed among the openings, a common electrode formed on the black matrix and the color filter, and an upper polarizer attached onto a back surface of the upper panel.

The present invention is not limited thereto, and the liquid crystal display panel 300 may be configured in various way. For example, the black matrix or the color filter may be positioned on the thin film transistor panel. The common electrode may be formed on the thin film transistor panel.

A liquid crystal layer is positioned between the lower panel and the upper panel, an alignment direction of the liquid crystal layer is changed by an electric field formed between the common electrode and the pixel electrode and the liquid crystal layer controls the amount of light that penetrates the upper polarizer. As a result, the liquid crystal panel may display gray scales.

The three dimensional display includes a signal controlling unit 710, a data driving IC 610, and a gate driving unit 400 to drive the liquid crystal panel 300. The data driving integrated chip (IC) 651 is positioned on a flexible printed circuit board 610. The signal controlling unit 710 is positioned on a printed circuit hoard (PCB) 751. The flexible printed circuit board 610 connects the PCB 751 to the thin film transistor substrate of the liquid crystal panel 300.

The gate driving unit 400 alternately applies gate-on voltage and gate-off voltage to a plurality of gate lines. For example, the gate-on voltage is sequentially it applied to each of the plurality of gate lines. The gate driving unit 400 may be formed as part of the thin film transistor substrate of the liquid crystal panel 300. For example, the gate driving unit 400 may be formed in the thin film transistor substrate of the liquid crystal panel 300 when the pixel of the liquid crystal panel 300 is formed. Alternatively, the gate driving unit 400 may be attached to the crystal panel 300. In that case, the gate driving unit 400 may be provided as a separate integrated circuit chip.

The data driving IC 651 applies data voltage to the data line. For example, the data driving IC 651 may convert image data (digital signal) applied from the signal controlling unit 710 into data voltage (analog signal) to apply the data voltage to the data line.

The signal controlling unit 710 processes an image signal received from the outside. The signal controlling unit 710 further transfers the processed image signal to the data driving IC 610 as image data. The signal controlling unit 710 applies a control signal to the gate driving unit 400 and the data driving IC 651 to control the gate driving unit 400 and the data driving IC 651. In assembling the liquid crystal panel 300 in the three dimensional display, the PCB 751 having the signal controlling unit 710 may be bent and placed on the back of the backlight unit 350.

In the three dimensional display, the backlight unit 350 is positioned on the back surface of the liquid crystal panel 300.

The backlight unit 350 includes a light source and provide light of the light source to the liquid crystal panel 300. The light source may be placed to emit light toward the liquid crystal panel 300 and placed to emit the light parallel to a lower surface of the liquid crystal panel 300. When the light of the light source is emitted parallel to the lower surface of the liquid crystal panel 300, a direction of the light is changed so as to emit the light toward the liquid crystal panel 300 by using a light guiding plate and a reflection sheet.

The backlight unit 350 may further include optical sheets such as a diffusion sheet, a prism sheet, and a luminance improvement film, in addition to the light source.

Further, the reflection sheet is positioned on the bottom of the backlight unit 350 to reflect light emitted downward to the top, which is emitted toward the liquid crystal panel 300. Further, the backlight unit 350 may include a film that reflects some light and in this case, the reflected light is reflected again on the reflection sheet to recycle the light, thereby improving efficiency of the light.

The liquid crystal panel 300 and the backlight unit 350 are used as a 2D image display device. The present invention is not limited thereto, and various display panels (including a plasma display panel, a light emitting diode display panel, an electrophoretic display panel, and the like) may be used as a 2D image display device for a three dimensional display according to an exemplary embodiment. Further, in the case of a self-light emitting display panel, the backlight unit 350 may be omitted.

A three dimensional display may convert the 2D image of a 2D image display device to a three dimensional (3D) stereoscopic image using the liquid crystal lens 500. The liquid crystal lens 500 may display a 2D image and a 3D stereoscopic image. For example, the liquid crystal lens 500 may selectively display one of a 2D image and a 3D stereoscopic image. The liquid crystal lens 500 may also be referred to as a switchable zone plate.

The liquid crystal lens 500 also includes a lens controlling unit 720 and an electrode voltage applying IC 620. The lens controlling unit 720, positioned on a PCB 752, controls the liquid crystal lens 500 selectively to display a 2D image or a 3D stereoscopic image. For example, for a 2D image, the lens controlling unit 720 does not apply a separate signal. For a 3D stereoscopic image, the lens controlling unit 720 separately control each electrode using the electrode voltage applying IC 620 in a digital type. The electrode voltage applying IC 620 converts an output of the lens controlling unit 720 into analog voltage and applies the analog voltage to each electrode. The electrode voltage applying IC 620 is positioned on a flexible printed circuit board 652. The PCB 752 where the lens controlling unit 720 is positioned may also be bent and placed to the back of the backlight unit 350.

Herein, the lens controlling unit 720 of the liquid crystal lens 500 corresponds to the signal controlling unit 710 of the liquid crystal panel 300 and the electrode voltage applying IC 620 of the liquid crystal lens 500 corresponds to the data driving IC 610 of the liquid crystal panel 300. The liquid crystal lens 500 does not include a corresponding structure such as the gate driving unit 400 of the liquid crystal panel 300.

A predetermined gap between the liquid crystal lens 500 and the liquid crystal panel 300 may increase definition of a 3D stereoscopic image. For example, a gap glass 550 is interposed between the liquid crystal lens 500 and the liquid crystal panel 300 to have gap between the liquid crystal lens 500 and the liquid crystal panel 300.

Hereinafter, an electrode structure of the liquid crystal lens 500 will be described in more detail with reference to FIGS. 2 and 3.

Figure 2:
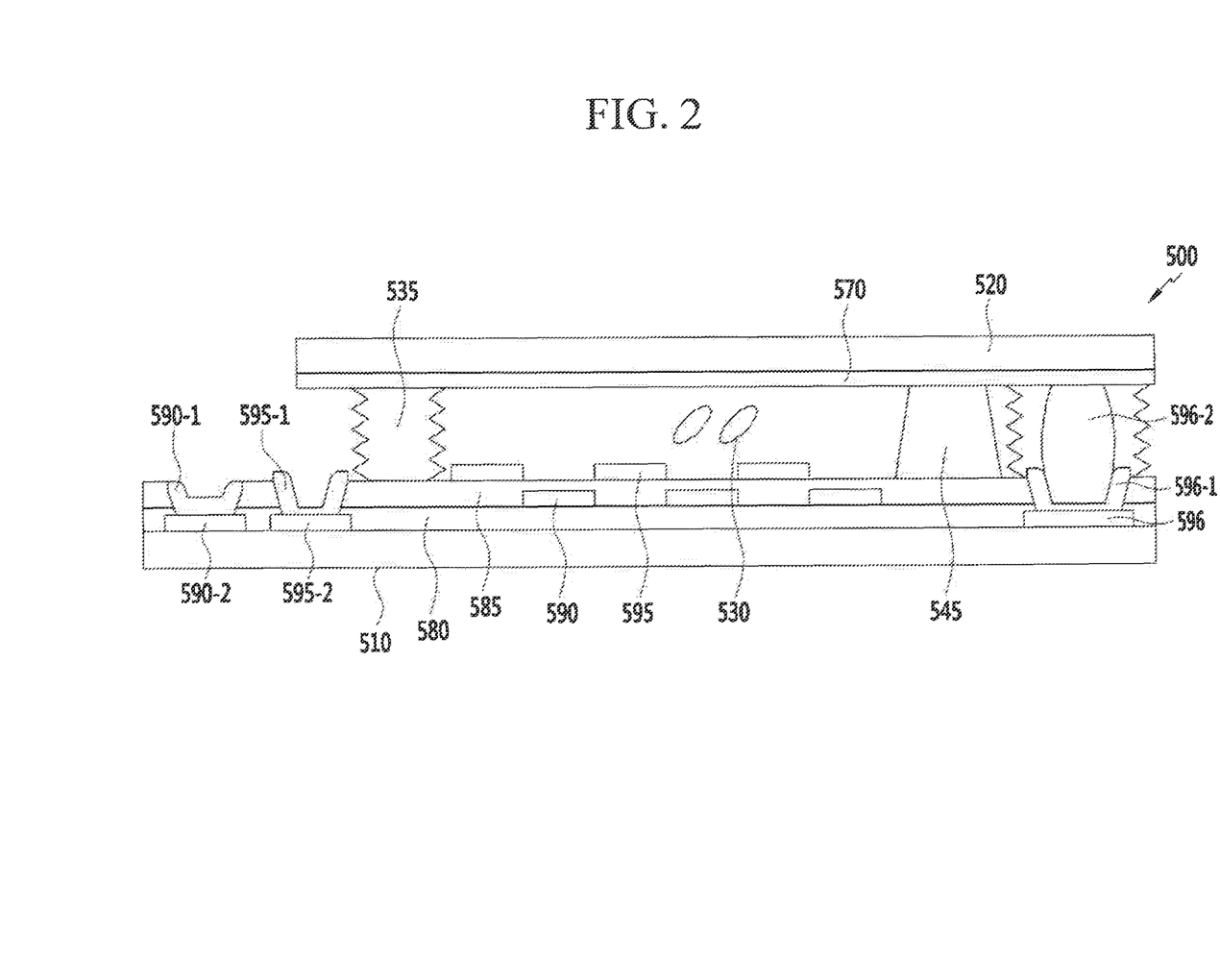
FIG. 2 is a cross-sectional view illustrating a liquid crystal lens according to an exemplary embodiment of the present invention.

FIG. 2 is a cross-sectional view illustrating a liquid crystal lens according to an exemplary embodiment of the present invention. FIG. 3 is a layout view of the liquid crystal lens according to an exemplary embodiment of the present invention.

The liquid crystal lens 500 includes a lower substrate 510 an upper substrate 520, and a lens liquid crystal layer 530 interposed between the substrates 510 and 520.

Linear electrodes 590 and 595 are formed on the lower substrate 510. For example, the linear electrodes 590 and 595 are alternately disposed on two different passivation layers 580 and 585. The Linear electrodes 590 are disposed on a first passivation layer 580, and the linear electrodes 595 are disposed on a second passivation layer 585. The second passivation layer 580 covers the linear electrode 590. A plate electrode 570 is formed on the upper substrate 520. For example, the plate electrode 570 may cover an entire bottom surface of the upper substrate 520.

A structure of the lower substrate 510 will be described with reference to FIGS. 2 and 3.

Voltage applying wires 590-2 and 595-2 for applying voltage to the linear electrodes 590 and 595 positioned on two different layers are formed on the lower substrate 510. The voltage applying wires 590-2 and 595-2 are exposed. For example, the voltage applying wires 590-2 and 595-2 are not covered with the lens liquid crystal layer 530.

Further, a common voltage applying wire 596 for applying voltage to the plate electrode 570 of the upper substrate 520 is also positioned on the lower substrate 510.

The first passivation layer 580 is positioned on the voltage applying wires 590-2 and 595-2 and the common voltage applying wire 596.

The lower linear electrode 590 is positioned on the first passivation layer 580. The lower linear electrode 590 is covered with the second passivation layer 585. The upper linear electrode 595 is positioned on the second passivation layer 585.

Figure 3:
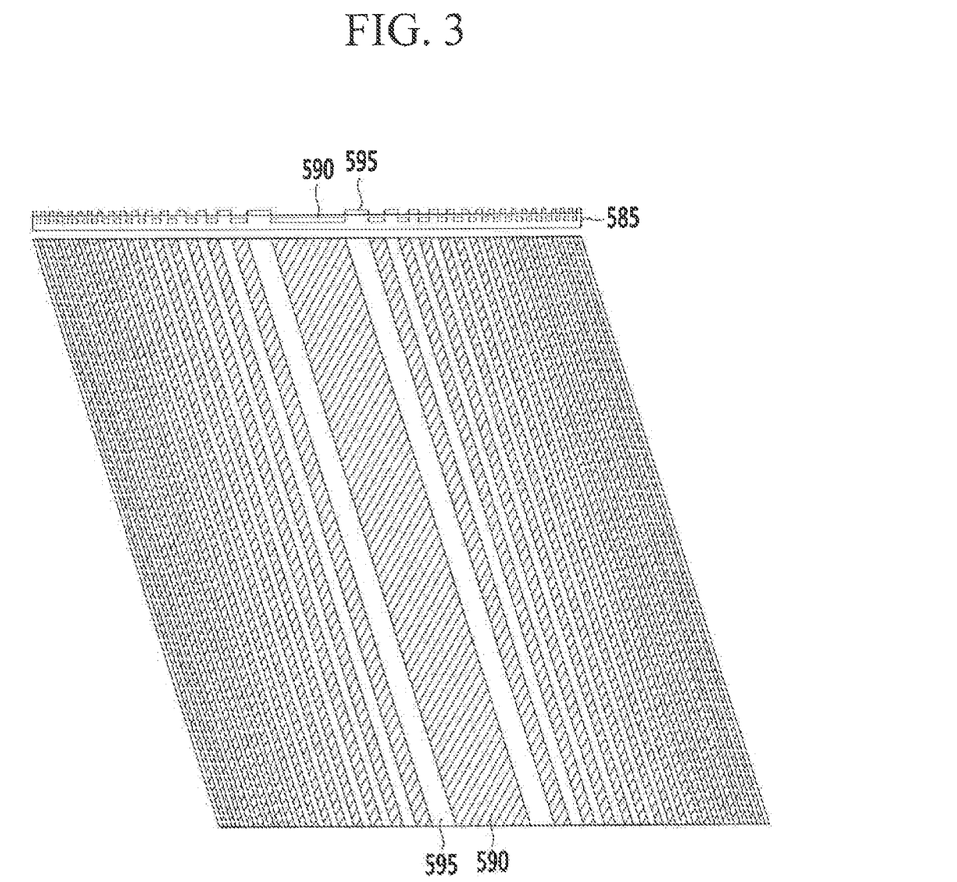
FIG. 3 is a layout view of a liquid crystal lens according to an exemplary embodiment of the present invention.

Referring to FIG. 3, the upper linear electrode 595 and the lower linear electrode 590 are extended in parallel to each other. Further, the upper linear electrode 595 and the lower linear electrode 590 are overlapped at their boundaries such that the upper linear electrode 595 and the lower linear electrode 590 are alternately disposed without gap between in a plan view. Alternatively, the upper linear electrode 595 and the lower linear electrode 590 are alternately arranged having a gap between them. One direction in which the upper linear electrode 595 and the lower linear electrode 590 are extended is not parallel to a direction in which the pixel of the liquid crystal panel 300 is extended.

The upper linear electrode 595 and the lower linear electrode 590 are formed, to have large widths at the center of one zone and the widths may be decreased toward a boundary of the zone.

In FIG. 3, a cross-section view is also illustrated in an upper part of the figure together with the layout view of the upper linear electrode 595 and the lower linear electrode 590. Further, the upper linear electrode 595 and the lower linear electrode 590 illustrated in FIG. 3 form one zone and a plurality of zones is formed in the liquid crystal lens 500. One zone may constitute one liquid crystal lens.

As illustrated in FIGS. 2 and 3, the upper linear electrode 595 and the lower linear electrode 590 are alternately positioned in one zone.

Further, contact holes for exposing the voltage applying wires 590-2 and 595-2 and the common voltage applying wire 596 are formed on the first passivation layer 580 and the second passivation layer 585 and pads 590-1, 595-1, and 596-1 are formed through the contact holes. Voltage to be applied to the upper linear electrode 595 and the lower linear electrode 590 is applied to the pads 590-1 and 595-1 connected with the voltage applying wires 590-2 and 595-2. Further, the pad 596-1 connected to the common voltage applying wire 596 is connected with a short-circuit portion 596-2, and as a result, common voltage is connected to the plate electrode 570. The short-circuit portion 596-2 penetrates a seal member 535 to be in contact with the pad 596-1.

Meanwhile, the plate electrode 570 is placed on an entire inner surface below the upper substrate 520. The plate electrode 570 receives the common voltage from the short-circuit portion 596-2.

The lens liquid crystal layer 530 is positioned between the lower substrate 510 and the upper substrate 520. The liquid crystal layer 530 is surrounded by the upper substrate 520, the lower substrate 510, and the seal member 535. Although not illustrated, an alignment layer is positioned on an innermost surface of each of the lower substrate 510 and the upper substrate 52.

The alignment direction of the liquid crystal layer 530 is changed by an electric field generated by the upper linear electrode 595, the lower linear electrode 590 and the plate electrode 570, and as a result, the liquid crystal lens is formed. Such electric field defines a unit zone that serves as a unit of crystal lens. The liquid crystal lens 500 includes a plurality of zones each of which is defined by each lower linear electrode 590, each upper linear electrode 595 and the plate electrode 570.

In the liquid crystal lens 500, the electric field is not applied at the time of displaying the 2D image and the liquid crystal lens is configured by repeating a maximum value (alternatively, a largest value) and a minimum value (alternatively, a smallest value) of a phase difference provided by the lens liquid crystal layer 530 at the time of displaying the 3D stereoscopic image. Herein, one zone is defined by an area occupied by the linear electrode 590 that allows the phase difference to move from the maximum value to the minimum value by the voltage applied to the linear electrode 590 or move in an opposite direction thereto. Alternatively, one zone may be defined using a boundary where a tendency in which the applied voltage is increased or decreased is changed.

Figure 4:
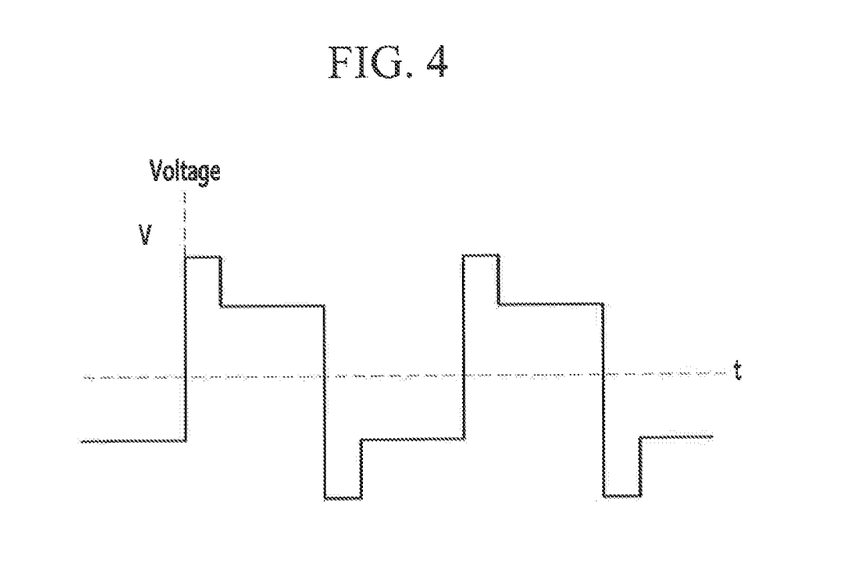
FIG. 4 is a voltage signal applied to an electrode of a liquid crystal lens according to an exemplary embodiment of the present invention.

The electrode voltage applying IC 620 may apply voltage having a waveform of FIG. 4 to the liquid crystal lens 500 having the structure of FIGS. 2 and 3.

FIG. 4 is a waveform diagram of voltage applied to an electrode of the liquid crystal lens according to an exemplary embodiment of the present invention.

The voltage waveform illustrated in FIG. 4 is voltage applied to at least one of the linear electrode 590 and 595. A voltage waveform, which is inversely driven to prevent liquid crystal molecules of the lens liquid crystal layer 530 from being deteriorated, is illustrated in FIG. 4. An inversion frequency of the voltage applied to the linear electrodes 590 and 595 may be varied and may be lower than a frequency of the liquid crystal panel 300. Alternatively, the inversion frequency of the voltage applied to the linear electrodes 590 and 595 may be higher than the frequency of the liquid crystal panel 300. When the inversion frequency of the voltage applied to at least one of the linear electrodes 590 and 595 is high, the liquid crystal lens 500 may be operated in various ways in addition to a inversion driving method.

Voltage (overshoot voltage) higher than target voltage is included in the voltage applied to the linear electrodes 590 and 595. Since the overshoot voltage may have a negative value, the overshoot voltage is defined as voltage having a absolute value greater than the target voltage. Herein, the absolute value is based on voltage (voltage corresponding to a horizontal dotted line in FIG. 4) which is a reference in voltage inversion.

When the voltage applied to the linear electrodes 590 and 595 is inverted, the overshoot voltage is first applied and thereafter, the target voltage is applied and maintained. Such pattern of first applying overshoot voltage and then applying target voltage may allow the lens liquid crystal layer 530 more rapidly to be aligned an electric field generated by the linear electrodes 590 and 595. As a result, a response speed is increased.

Figure 5:
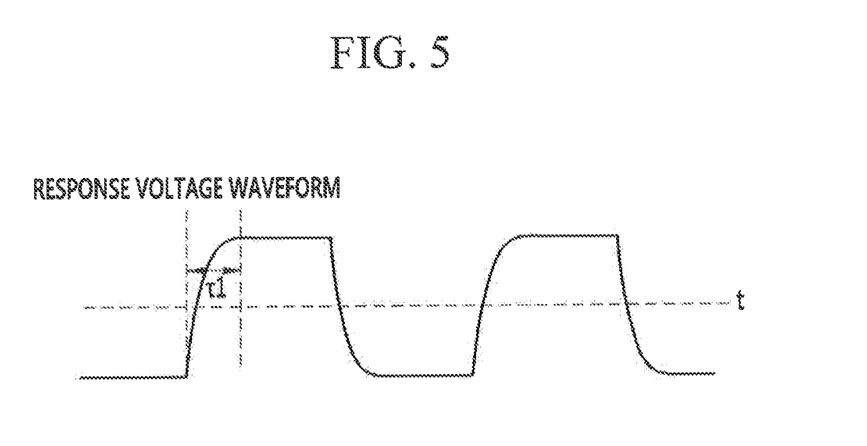
FIG. 5 is a response voltage signal in response to a voltage waveform of FIG. 4.

When the voltage of FIG. 4 is applied to the linear electrodes 590 and 595, a response voltage waveform of the liquid crystal molecule of the lens liquid crystal layer 530 is illustrated in FIG. 5.

Referring to FIG. 5, the response voltage waveform includes a response time τ1. For example, the response voltage waveform is stabilized after the response time τ1 in response to the overshoot voltage of FIG. 4. When liquid crystal molecules are aligned in response to voltage, it may be referred to as being stabilized. The response time τ1 may be referred to as a time that it takes for liquid crystal molecules to be arranged in response to voltage. According to an exemplary embodiment, the response timer may be reduced when voltage applied to the linear electrodes 590 and 595 includes overshoot voltage. Therefore, the overshoot voltage may facilitate an initial alignment of liquid crystal molecules by strengthening the electric field applied to the liquid crystal molecules of the lens liquid crystal layer 530, thereby increasing the response speed.

Figure 6:
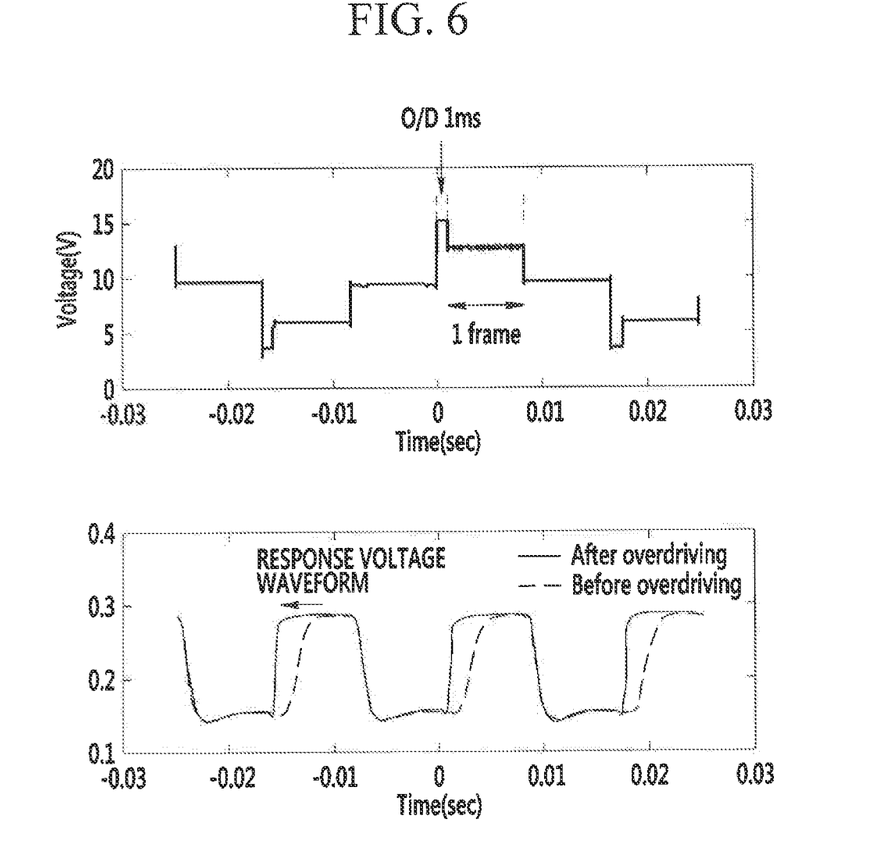
FIG. 6 is a voltage waveform and a response voltage signal in response to the voltage waveform diagram according to an exemplary embodiment of the present invention.

A result of simulating the voltage application of FIG. 4 is illustrated in FIG. 6.

FIG. 6 is a diagram illustrating a waveform obtained by applying voltage to an exemplary embodiment of the present. The waveform of FIG. 6 shows an increased resultant response.

The upper voltage waveform shows a voltage waveform applied to the linear electrodes 590 and 595, and the lower voltage waveform shows the response voltage waveform of the liquid crystal molecules of the lens liquid crystal layer 530. The voltage waveform applied to the linear electrodes 590 and 595 includes overshoot. In the response voltage waveform, the line waveform corresponds to the response to the voltage waveform including overshoot applied to the linear electrodes 590 and 595. For comparison, the lower voltage waveform includes the dotted line waveform corresponding to the response to a voltage waveform without overshoot.

When the voltage including the overshoot voltage is applied to the linear electrodes 590 and 595, the response speed is increased as compared with the case in which the voltage without the overshoot is applied to the linear electrodes 590 and 595.

Hereinafter, a difference depending on a gray scale will be described with reference to FIG. 7.

Figure 7:
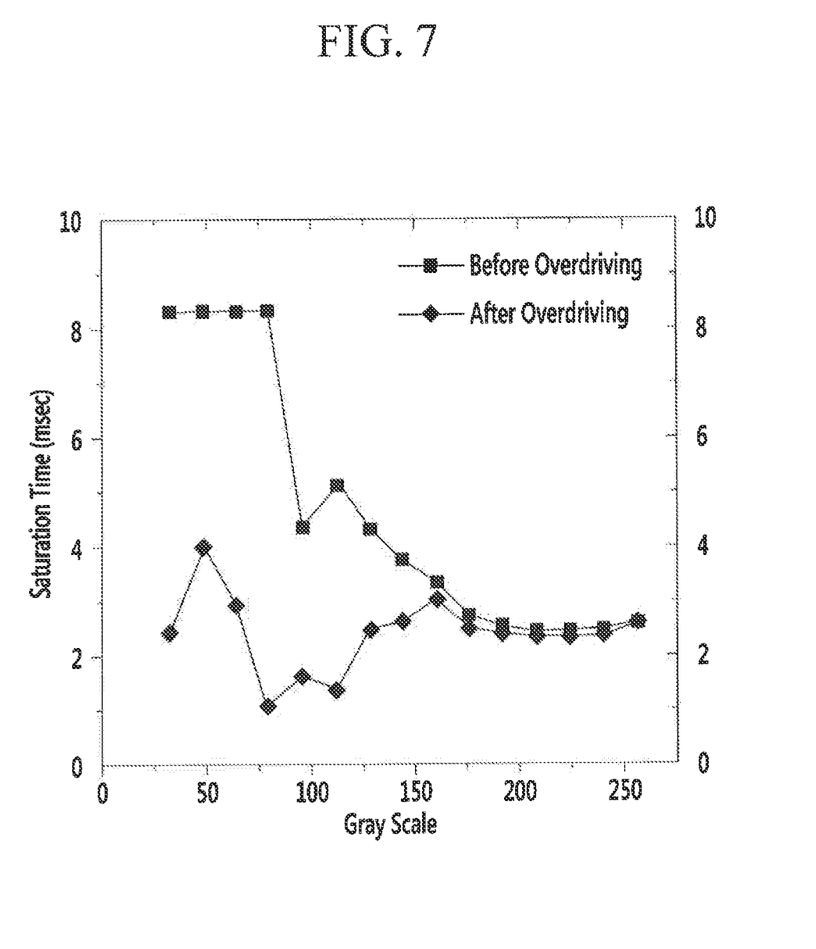
FIG. 7 is saturation time for a gray scale in response to a voltage signal according to an exemplary embodiment of the present invention.

FIG. 7 is a graph comparing response speeds of an exemplary embodiment and a comparative example of the present invention for each gray scale.

FIG. 7 shows saturation times ("after overdriving") in response to voltage including overshoot voltage and saturation times ("before overdriving") in response to voltage without overshoot voltage.

The horizontal axis indicates a gray scale, and the vertical axis indicates a saturation time corresponding to a time that it takes the liquid crystal molecules to be arranged in a target alignment (saturation) in response to voltage. As the saturation time decreases, the response speed increases.

As illustrated in FIG. 7, the saturation times of after-overdriving cases are similar to the saturation times of before-overdriving cases in high gray scales.

However, the saturation times of after-overdriving cases are smaller than those of before-overdriving cases in low gray scales. For example, in low gray scales between about 25 and about 100, the saturation times of the after-overdriving cases are about 8 millisecond while the saturation times of the before-overdriving cases are about 1 millisecond to about 4 millisecond. The response speed is significantly increased in low gray scales. This is because it takes more time for the liquid crystal molecules to be aligned in response to the lower voltage of the low gray scale, and as a result, the saturation time is increased. When the voltage applied to the liquid crystal molecules includes overshoot voltage, the saturation times of the liquid crystal molecules are increased.

As the overshoot voltage applied to each of the linear electrodes 590 and 595, a value stored in a look-up table may be used.

Figure 8:
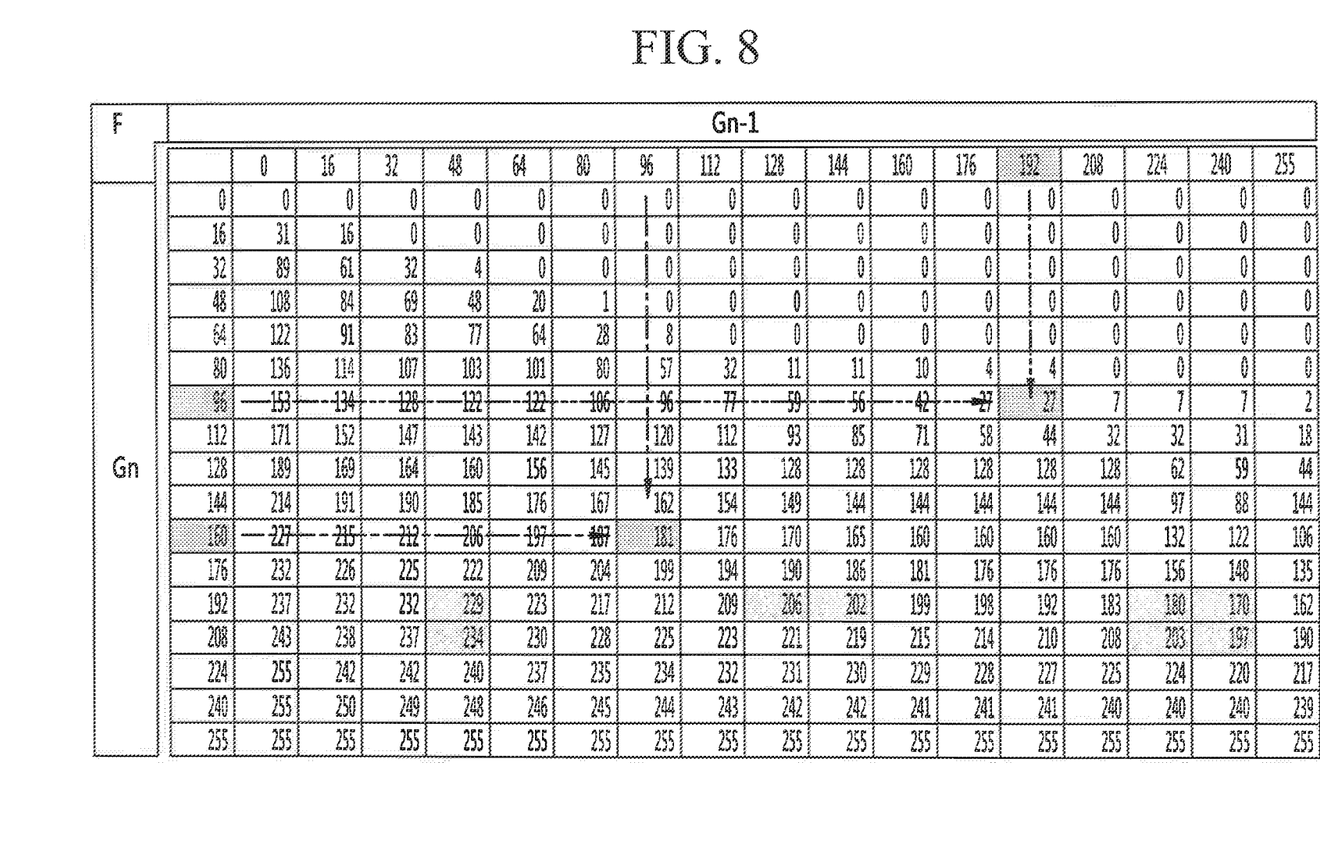
FIG. 8 is a look-up table of overshoot voltage according to an exemplary embodiment of the present invention.

One example of a look-up table showing the overshoot voltage is illustrated in FIG. 8.

FIG. 8 is a look-up table of overshoot voltage according to an exemplary embodiment of the present invention.

When the look-up table is used, predetermined overshoot voltage may be applied.

Voltage including one overshoot voltage, which is applied to the linear electrodes 590 and 595, has been described above.

Hereinafter, an exemplary embodiment in which various voltage is applied to the linear electrodes 590 and 595 will be described.

First, an exemplary embodiment including stepwise overshoot voltage will be described with reference to FIGS. 9 and 10.

Figure 9:
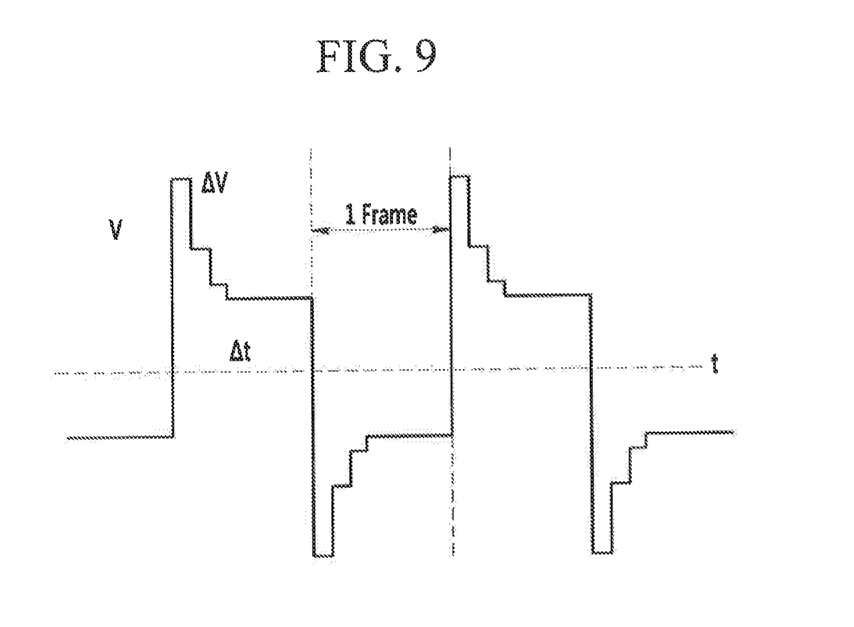
FIG. 9 is a waveform diagram of voltage applied to an electrode of a liquid crystal lens according to an exemplary embodiment of the present invention.

FIG. 9 is a waveform diagram of voltage applied to an electrode of the liquid crystal lens according to an exemplary embodiment of the present invention. FIG. 10 illustrates a response voltage waveform depending on a voltage waveform of FIG. 9.

Referring to FIG. 9, when the voltage applied to the linear electrodes 590 and 595 is inverted, the stepwise overshoot voltage is first applied and thereafter, the target voltage is applied and maintained. In such stepwise overshoot voltage, overshoot voltage having a largest absolute value is first applied during a predetermined period. Overshoot voltage having a smaller absolute value is applied at least once after the overshoot voltage having the largest absolute value. Finally, the target voltage is applied. The overshoot voltage is sequentially applied with decreasing absolute value. The overshoot voltage includes at least two overshoot voltage levels. The magnitudes, the application time, and the number of respective overshoot voltages constituting the stepwise overshoot voltage may vary in an exemplary embodiment of the present invention.

The overshoot voltages constituting the stepwise overshoot voltage have absolute values larger than the target voltage.

The voltage waveform illustrated in FIG. 9 is voltage applied to at least one of the linear electrode 590 and 595. A voltage waveform, which is inversely driven to prevent liquid crystal molecules of the lens liquid crystal layer 530 from being deteriorated, is illustrated in FIG. 9. An inversion frequency of the voltage applied to the linear electrodes 590 and 595 may be varied and may be lower than a frequency of the liquid crystal panel 300. Alternatively, the inversion frequency of the voltage applied to the linear electrodes 590 and 595 may be higher than the frequency of the liquid crystal panel 300. When the inversion frequency of the voltage applied to the linear electrodes 590 and 595 is high, the liquid crystal lens 500 may form liquid crystal lenses having various structures in addition to inversion driving.

Figure 10:
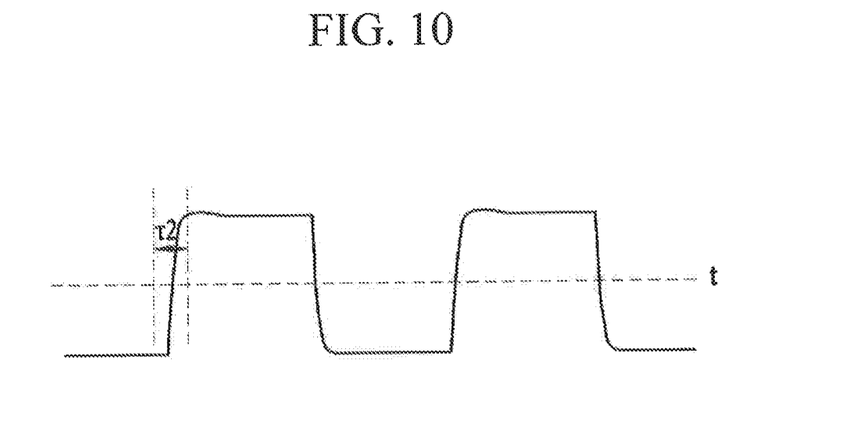
FIG. 10 is a diagram illustrating a response voltage waveform in response to the voltage waveform of FIG. 9.

When the voltage of FIG. 9 is applied to at least one of the linear electrodes 590 and 595, a response waveform of the liquid crystal molecule of the lens liquid crystal layer 530 is illustrated in FIG. 10.

FIG. 10 shows a waveform in which the alignment direction of the liquid crystal molecules of the lens liquid crystal layer 530 is changed by the electric field generated by the voltage of FIG. 9.

Referring to FIG. 10, the response voltage waveform includes a response time τ2. For example, the response voltage waveform is stabilized after the response time τ2 in response to the overshoot voltage of FIG. 9. The overshoot vintage may facilitate an initial alignment of liquid crystal molecules by strengthening the electric field applied to the liquid crystal molecules of the lens liquid crystal layer 530, thereby increasing the response speed.

When the overshoot voltage having the larger absolute value than the target voltage is applied as described above, the response speed of the liquid crystal molecules of the lens liquid crystal layer 530 is increased.

Hereinafter, voltage waveforms of various exemplary embodiments, which may be applied to the linear electrodes 590 and 595, will be described.

Figure 11:
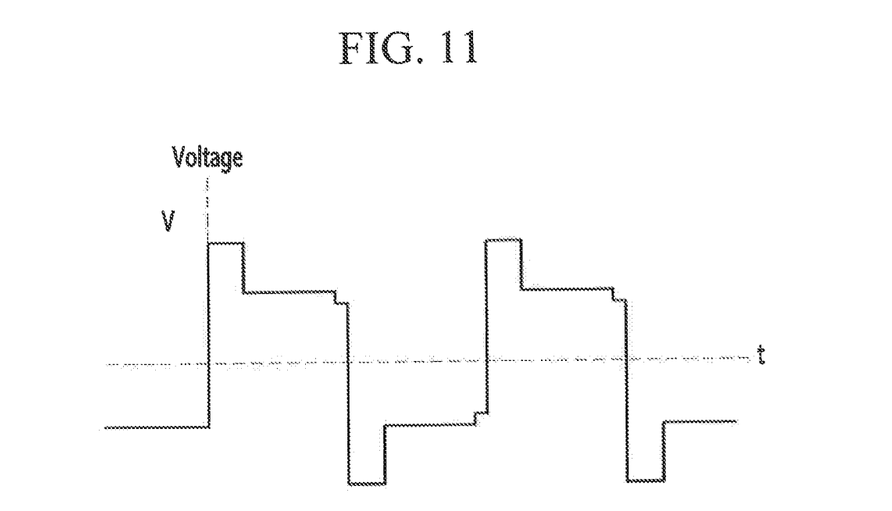
FIGS. 11 to 13 are waveform diagrams of voltage applied to an electrode of a liquid crystal lens according to an exemplary embodiment of the present invention.
Figure 12:
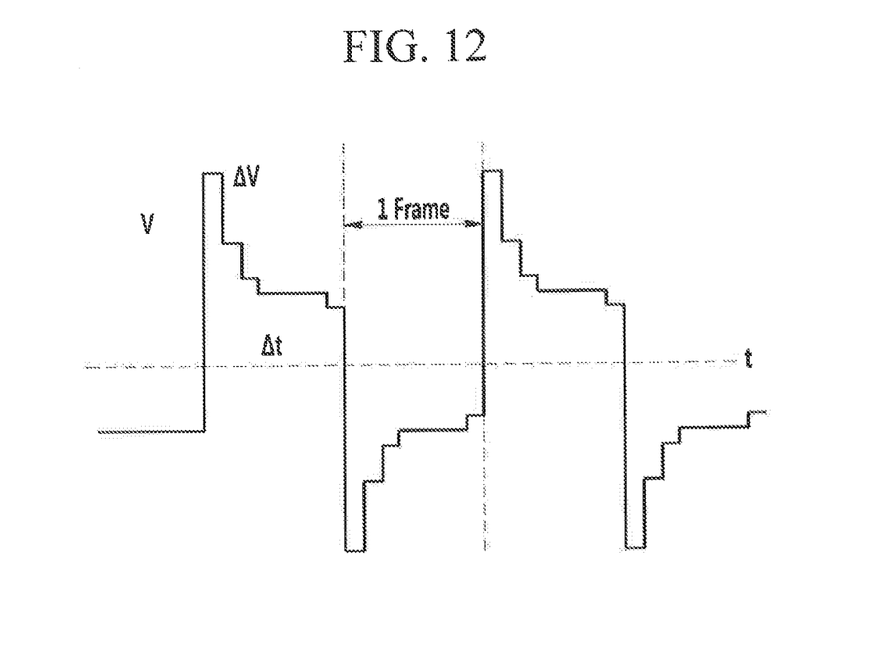
Figure 13:
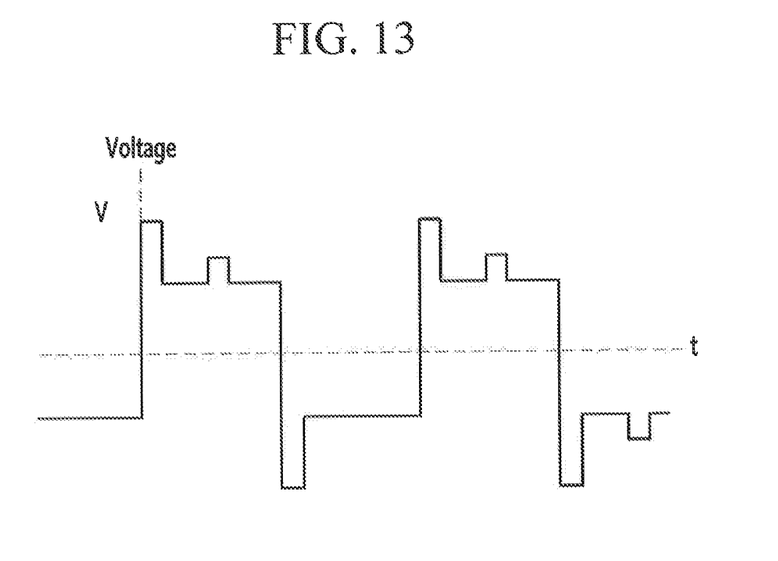

FIGS. 11 to 13 are waveform diagrams of voltage the applied to liquid crystal lens according to an exemplary embodiment of the present invention.

Referring to FIG. 11, a voltage waveform includes pre voltage smaller than a target voltage during a predetermined section before polarity is inverted. The pre voltage reduces a voltage variation width before overshoot voltage having an opposite polarity is applied according to polarity inversion. In FIG. 11, a difference in magnitude between pre voltage and the target voltage is small. The pre voltage, however, may have various magnitudes.

Referring to FIG. 12, a voltage waveform is substantially similar to the voltage waveform of FIG. 9, except that the voltage waveform of FIG. 12 includes pre voltage such as FIG. 11.

For example, when the polarity inversion is achieved, the stepwise overshoot voltage is first applied, the target voltage is applied, and then the pre voltage is applied before subsequent polarity inversion is achieved. The voltage waveform may have various magnitudes, and/or application times.

Referring to FIG. 13, a voltage waveform is similar to that of FIG. 4, except that the voltage waveform of FIG. 13 includes medium overshoot voltage.

For example, when a polarity of voltage is inverted, the overshoot voltage is first applied, the target voltage is applied, the medium overshoot voltage is applied, and then the target voltage is applied again. Herein, the medium overshoot voltage is also voltage having a larger absolute value than the target voltage and is voltage having the same polarity as the target voltage and the overshoot voltage. The overshoot voltage includes the highest voltage level and the medium overshoot voltage level. The medium voltage level is between the highest overshoot voltage level and the target voltage. Alternatively, the medium overshoot voltage level may be greater than the highest overshoot voltage level. Alternatively, the voltage waveform may include the medium overshoot voltage only.

Various voltage waveforms may be generated to increase response time in a response voltage waveform. For example, at least one voltage of overshoot voltage and medium overshoot voltage may have a stepwise structure of FIG. 13, and pre voltage may be additionally included in the voltage waveform of FIG. 13.

When the voltage including the overshoot voltage is applied to the linear electrodes 590 and 595 of the liquid crystal lens 500 as described above, an operation speed of the liquid crystal lens is increased. When a stereoscopic image is displayed, in an exemplary embodiment of the three dimensional display in which the liquid crystal lens is fixed, the liquid crystal lens operates at a lower frequency than the display panel 300, but a change of the liquid crystal lens is required to provide more various 3D images. For example, the liquid crystal lens needs to vary in order to provide a stereoscopic image to a plurality of users or improve resolution of the 3D image, and may operate at a higher frequency than the display panel 300. When the liquid crystal lens 500 intends to operate at the high frequency as such, the liquid crystal lens 500 may operate with the voltage including the overshoot voltage like the present invention.

Voltage at a predetermined level is applied to the plate electrode of the liquid crystal lens 500, and constant common voltage is applied.

While the present invention has been shown and described with reference to exemplary embodiments thereof, it will be apparent to those of ordinary skill in the art that various changes in form and detail may be made therein without departing from the spirit and scope of the present invention as defined by the following claims.

What is claimed is:

1. A three dimensional image display, comprising:
a display panel; and
a liquid crystal lens positioned on the top of the display panel, wherein the liquid crystal lens comprises:
   a first substrate comprising a first electrode;
   a second substrate comprising a second electrode, wherein the second substrate faces the first substrate;
   a lens liquid crystal layer positioned between the first substrate and the second substrate; and
   an electrode voltage applying integrated chip (IC) sequentially applying first voltage and second voltage to the first electrode,
   wherein the first voltage includes an overshoot voltage level,
   wherein the second voltage has an inverted polarity of the first voltage,
   wherein the first electrode comprises a first linear electrode and a second electrode formed in different layers, and
   wherein the second electrode comprises a plate electrode.

2. The three dimensional image display of claim 1, wherein the first voltage further includes a target voltage level.

3. The three dimensional image display of claim 2, wherein the overshoot voltage level is followed by the target voltage level, wherein an absolute value of the overshoot voltage level is greater than an absolute value of the target voltage level.

4. The three dimensional image display of claim 1, wherein the overshoot voltage level is decreased to the target voltage level in a stepwise manner.

5. The three dimensional image display of claim 4, wherein the second voltage includes an overshoot voltage level and a target voltage level whose polarities are opposite to the first voltage, wherein the overshoot voltage level of the second voltage is followed by the target voltage level of the second voltage.

6. The three dimensional image display of claim 5, wherein an absolute value of the overshoot voltage level, in the second voltage is greater than an absolute value of the target voltage in the second voltage.

7. The three dimensional image display of claim 6, wherein the overshoot voltage level of the second voltage is increased to the target voltage level of the second voltage in a stepwise manner.

8. The three dimensional image display of claim 7, wherein the overshoot voltage level of the first voltage includes at least two overshoot voltage levels.

9. The three dimensional image display of claim 2, wherein the first voltage applied to the first electrode further comprises a pre voltage level, wherein the target voltage level of the first voltage is followed by the pre voltage level of the first voltage, wherein the pre voltage level of the first voltage is followed by the second voltage.

10. The three dimensional image display of claim 9, wherein an absolute value of the pre voltage level in the first voltage is smaller than an absolute value of the target voltage level in the first voltage.

11. The three dimensional image display of claim 10, wherein the second voltage includes an overshoot voltage level, a target voltage level and a pre voltage level, wherein the overshoot voltage level of the second voltage is followed by the target voltage of the second voltage, wherein the target voltage level of the second voltage is followed by the pre voltage level of the second voltage.

12. The three dimensional image display of claim 11, wherein the overshoot voltage level of the second voltage is increased to the target voltage level in a stepwise manner.

13. The three dimensional image display of claim 2, wherein the overshoot voltage level of the first voltage includes first and second overshoot voltage levels that are separated from one another by the target voltage level.

14. The three dimensional image display of claim 13, wherein the first overshoot voltage level of the first voltage is followed by the second overshoot voltage level of the first voltage, wherein an absolute value of the first overshoot voltage level in the first voltage is greater than an absolute value of the second overshoot voltage level in the first voltage.

15. The three dimensional image display of claim 1, wherein the second voltage includes a first overvoltage level, a second overvoltage and a target voltage therebetween.

16. The three dimensional image display of claim 15, wherein the first overvoltage level is followed by the second overvoltage, wherein an absolute value of the first overvoltage is greater than an absolute value of the second overvoltage.

17. The three dimensional image display of claim 1, wherein the first substrate further comprises:
a passivation layer between the first linear electrode and the second linear electrode.

18. A liquid crystal lens, comprising:
a first substrate comprising a first electrode;
a second substrate comprising a second electrode;
a lens liquid crystal layer positioned between the first substrate and the second substrate; and
an electrode voltage applying integrated chip (IC) sequentially applying first voltage and second voltage to the first electrode,
wherein the first voltage includes an overshoot voltage level, wherein the second voltage has an inverted polarity of the first voltage, and
wherein the overshoot voltage level of the first voltage is decreased to a target voltage level in a stepwise manner.

19. A liquid crystal lens, comprising:
a first substrate comprising a first electrode;
a second substrate comprising a second electrode;
a lens liquid crystal layer positioned between the first substrate and the second substrate; and
an electrode voltage applying integrated chip (IC) sequentially applying first voltage and second voltage to the first electrode,
wherein the first voltage includes an overshoot voltage level, wherein the second voltage has an inverted polarity of the first voltage, and
wherein the first voltage further comprises a pre voltage level, wherein the target voltage level is followed by the pre voltage level.

* * * * *